United States Patent
Ansel et al.

(10) Patent No.: US 10,055,389 B1
(45) Date of Patent: Aug. 21, 2018

(54) ORDERING DOCUMENTS WITHIN A CRAWLED WEBSITE

(71) Applicant: Go Daddy Operating Company, LLC, Scottsdale, AZ (US)

(72) Inventors: Jason Ansel, Cambridge, MA (US); Silas Boyd-Wickizer, Oakland, CA (US)

(73) Assignee: Go Daddy Operationg Company, LLC, Scottsdale, AZ (US)

( * ) Notice: Subject to any disclaimer, the term of this patent is extended or adjusted under 35 U.S.C. 154(b) by 336 days.

(21) Appl. No.: 14/738,258

(22) Filed: Jun. 12, 2015

(51) Int. Cl.
*G06F 17/24* (2006.01)
*G06F 17/22* (2006.01)

(52) U.S. Cl.
CPC ................. *G06F 17/2235* (2013.01)

(58) Field of Classification Search
CPC ............ G06F 17/2235; G06F 17/2241; G06F 17/30014; G06F 17/30864; G06F 17/30873; G06F 17/30696; G06F 17/3071; G06F 17/30235; G06F 17/30705; G06F 17/30707; G06F 17/3089; G06F 17/30994; G06F 3/0482
See application file for complete search history.

(56) References Cited

U.S. PATENT DOCUMENTS

| | | | | |
|---|---|---|---|---|
| 5,875,446 A * | 2/1999 | Brown | ............ | G06F 17/30864 |
| 6,035,330 A * | 3/2000 | Astiz | ............... | H04L 29/06 |
| | | | | 707/999.102 |
| 7,194,469 B1 * | 3/2007 | Dowd | ............... | G06F 17/2229 |
| 7,213,198 B1 * | 5/2007 | Harik | ............... | G06F 17/30864 |
| | | | | 707/999.005 |
| 7,587,411 B2 * | 9/2009 | De Vorchik | ...... | G06F 17/30235 |
| 7,617,176 B2 * | 11/2009 | Zeng | .................. | G06F 17/3071 |
| 2005/0076000 A1 * | 4/2005 | Sweet | ............... | G06F 17/30864 |
| 2006/0069699 A1 * | 3/2006 | Smadja | ............. | G06F 17/30879 |
| 2009/0204900 A1 * | 8/2009 | Champion | ............ | G06F 3/0482 |
| | | | | 715/738 |
| 2010/0185604 A1 * | 7/2010 | Keohane | ........... | G06F 17/30696 |
| | | | | 707/722 |

* cited by examiner

*Primary Examiner* — Wilson W Tsui
(74) *Attorney, Agent, or Firm* — Quarles and Brady LLP

(57) ABSTRACT

Systems and methods of the present invention provide for one or more server computers communicatively coupled to a network and configured to: access a source code for each of a plurality of web pages within a website hosted on the server computer; identify, within the source code of each of the plurality of web pages, a plurality of hyperlinks for navigating to at least one of the plurality of web pages; generate a plurality of link groups each comprising at least one common hyperlink between the plurality of hyperlinks; aggregate the plurality of link groups into a unique link group wherein each of the plurality of hyperlinks appears in only one link group; and determine an order of hyperlinks within the unique link group based on an original order of the plurality of hyperlinks.

14 Claims, 5 Drawing Sheets

| File  Edit  Tools     ⇐ ⇒ | |
|---|---|

APPETIZERS          DESSERTS

The Restaurant at LOCATION 1 – ENTREES

Breakfast:

| Entrée A | Description | $Price |
| Entrée B | Description | $Price |

Lunch:

| Entrée C | Description | $Price |
| Entrée D | Description | $Price |

Dinner:

| Entrée E | Description | $Price |
| Entrée F | Description | $Price |

FIG. 6

| File  Edit  Tools     ⇐ ⇒ | |
|---|---|

APPETIZERS          ENTREES

The Restaurant at LOCATION 1 – DESSERTS

Breakfast:

| Dessert A | Description | $Price |
| Dessert B | Description | $Price |

Lunch:

| Dessert C | Description | $Price |
| Dessert D | Description | $Price |

Dinner:

| Dessert E | Description | $Price |
| Dessert F | Description | $Price |

FIG. 7

ORDERING DOCUMENTS WITHIN A CRAWLED WEBSITE

FIELD OF THE INVENTION

The present invention generally relates to the field of Internet crawling and specifically to the field of grouping and ordering web links and/or web pages identified during a web crawl in order to automatically generate an ordered list of the crawled web content.

SUMMARY OF THE INVENTION

The present invention provides systems and methods comprising one or more server computers communicatively coupled to a network and configured to: access a source code for each of a plurality of web pages within a website hosted on the server computer; identify, within the source code of each of the plurality of web pages, a plurality of hyperlinks for navigating to at least one of the plurality of web pages; generate a plurality of link groups each comprising at least one common hyperlink between the plurality of hyperlinks; aggregate the plurality of link groups into a unique link group wherein each of the plurality of hyperlinks appears in only one link group; and determine an order of hyperlinks within the unique link group based on an original order of the plurality of hyperlinks.

The above features and advantages of the present invention will be better understood from the following detailed description taken in conjunction with the accompanying drawings.

BRIEF DESCRIPTION OF THE DRAWINGS

FIG. 6 is a user interface within an example embodiment generating an ordered content list from an Internet crawl.

FIG. 7 is a user interface within an example embodiment generating an ordered content list from an Internet crawl.

DETAILED DESCRIPTION

Figure 1:
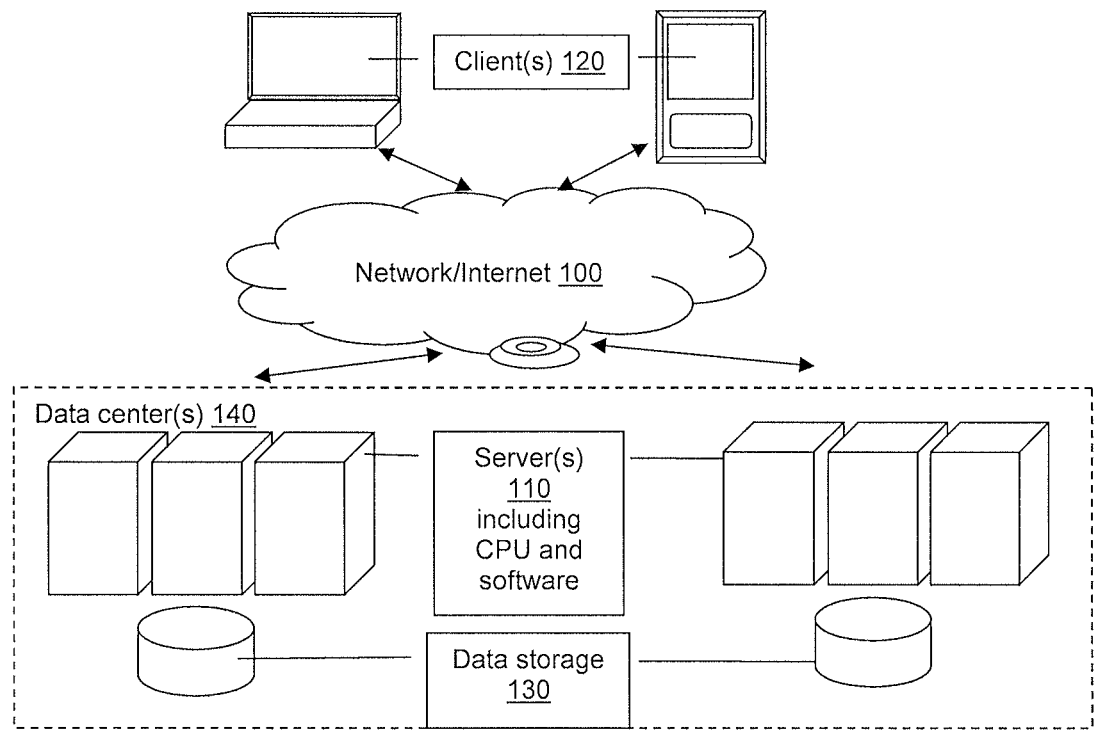
FIG. 1 illustrates a possible system for generating an ordered content list from an Internet crawl.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Because of the voluminous amounts of data available via the Internet, it can be difficult to effectively index content found on the web. A web indexer (also referred to as a web crawler or web spider) may be used to systematically browse the web and index website content for the browsed websites and/or web pages. A web crawler may also download, copy and process this indexed content, possibly for more efficient web searching.

Applicant has determined that though presently existing systems and methods may identify web page navigation and content during a web crawl, no currently-existing solutions organize this navigation or content into a correct order when reassembling or synthesizing the crawled pages. By default, web crawling can mix the crawled information together, randomizing the pages, content, menus and/or links of the website, possibly resulting in lost information. Presently existing systems and methods may attempt a depth-first or a breadth-first analysis to attempt to re-organize the original crawled content, but this does not order the content in the order that the website designer originally intended.

One particular challenge of content extraction during web crawling is that website content may be split across multiple pages. As a non-limiting example, a hair salon might have a webpage for each service it offers. A website crawler faces the challenge of synthesizing these pages in an order that accurately reflects the website authors' original desires. In this example, the salon website may have a separate webpage for men's, women's, and children's services. Using a depth first or breadth first analysis has the potential to lead to incorrect website semantics.

Applicant has therefore determined that optimal systems and methods will utilize page grouping and ordering algorithms that recover the order of the content, including pages, menus and/or links that may have been lost during the website crawl. These algorithms, executed within the disclosed environments described below, will detect, identify and analyze tables of contents (TOCs) and link groups in order to recover the original grouping and ordering lost during a website crawl. Disclosed systems and methods may order hypertext documents in a collection of web pages in such a way as to overcome the weaknesses in the prior art.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
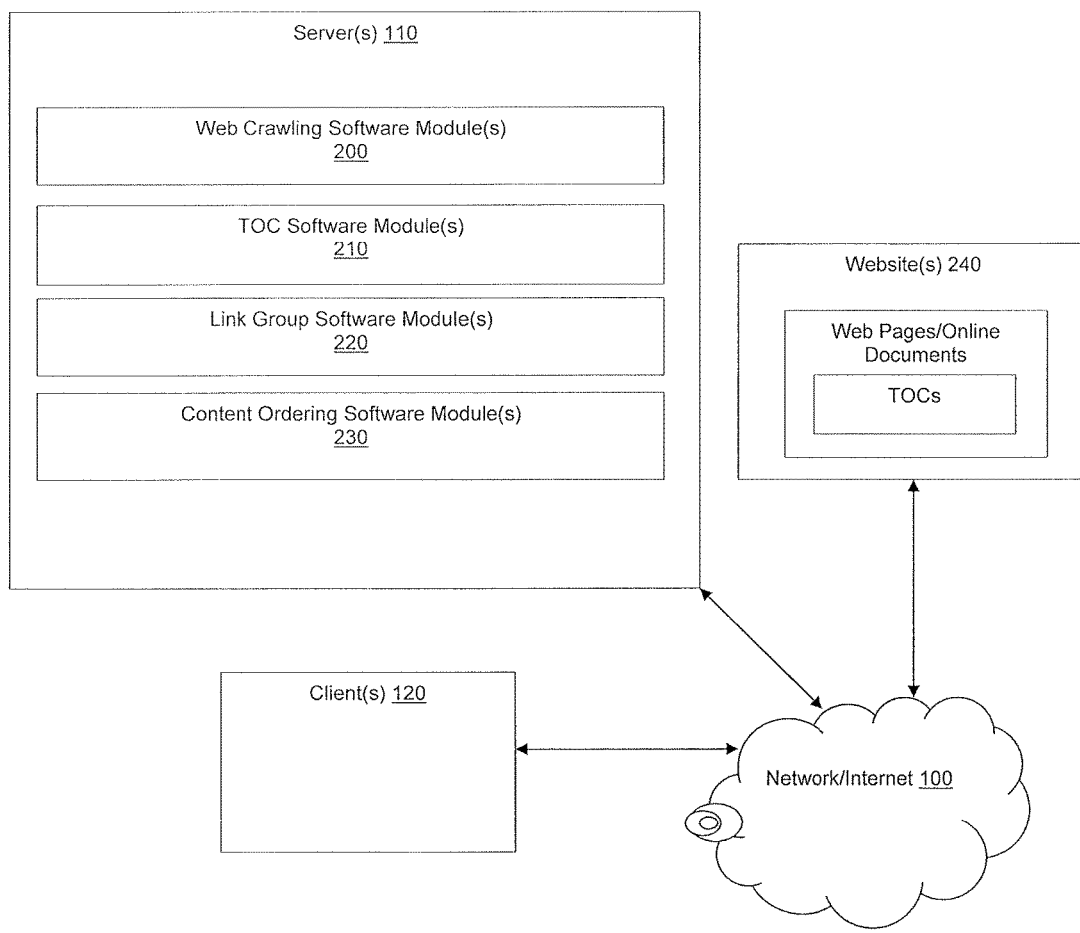
FIG. 2 illustrates a more detailed possible system for generating an ordered content list from an Internet crawl.

FIG. 2 shows a more detailed example embodiment of an environment for the systems, and for accomplishing the method steps, disclosed herein. As non-limiting examples, all disclosed software modules 200, 210, 220, 230 may run on one or more server(s) 110 Thus, the disclosed system may be configured to execute any or all of the method steps disclosed herein.

Figure 3:
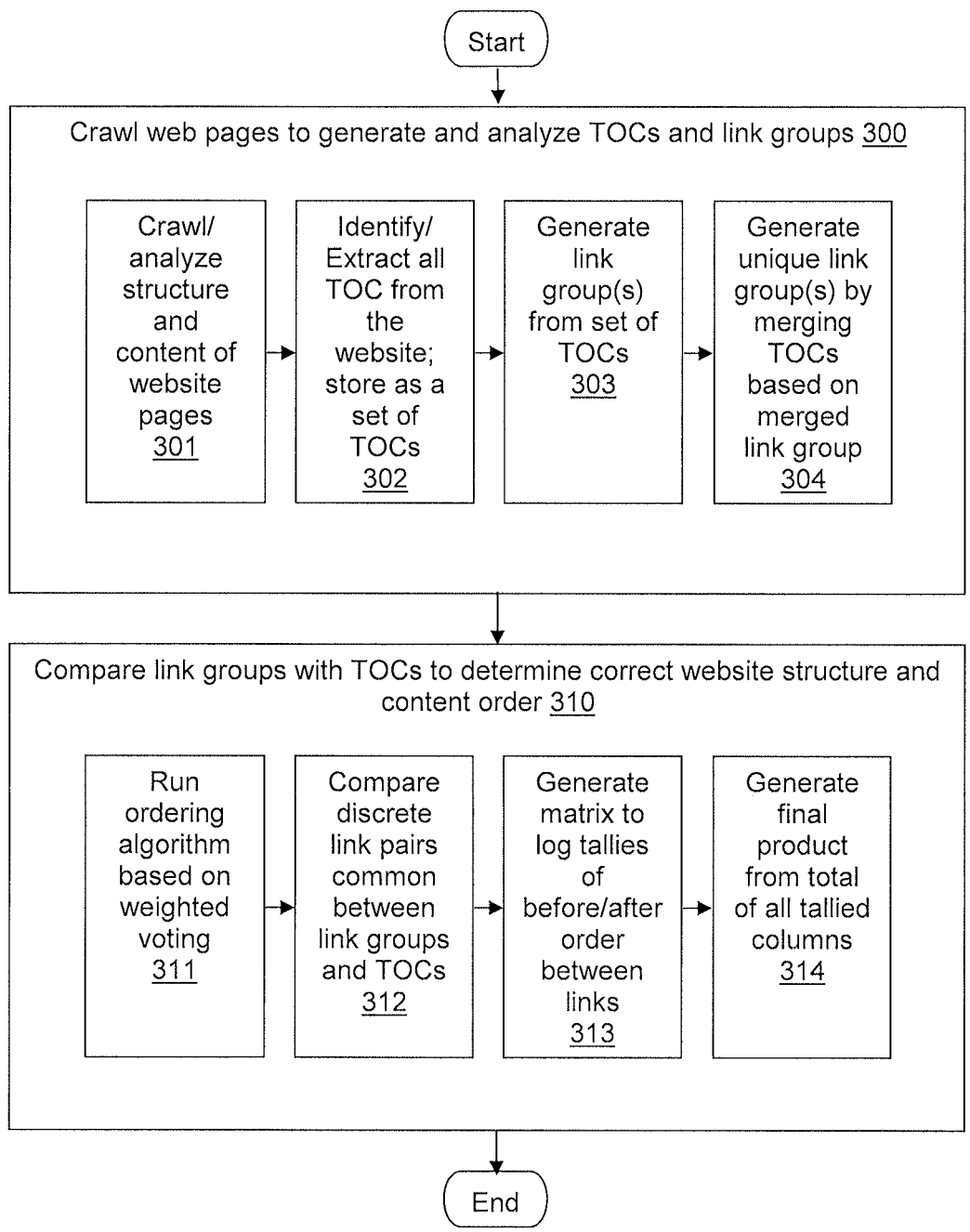
FIG. 3 is a flow diagram illustrating a possible embodiment of a method for generating an ordered content list from an Internet crawl.

FIG. 3 shows that the disclosed invention may generally comprise two steps: 1) crawling web pages to generate and analyze TOCs and link groups (Step 300); and 2) identify a correct website structure and/or content order by comparing link groups with the original TOCs (Step 310). As seen in FIG. 3, each of these two steps may be broken down into a plurality of sub-steps.

For example, one or more website crawling software module(s) 200 may be configured to crawl documents, possibly a plurality of web pages, within a website (Step 301). Although the disclosed invention uses web pages within websites as an example of the content that can be crawled, indexed, generated into TOCs/link groups, ordered and/or synthesized, the disclosed invention may apply broadly to any electronic documents accessible online and containing hyperlinks or other hypertext content.

The website crawling software 200 may be configured to identify and extract a collection or list of hypertext documents as a canon of content within the website. Each of these hypertext documents may be identified as a web page containing internal hyperlinks.

A non-limiting example seen in FIGS. 4-7 is used throughout this disclosure to demonstrate the features and characteristics of the disclosed invention. In this example, a restaurant may operate multiple locations, and a website, including a landing page with links to all four locations may be accessible via a common domain name (e.g., therestaurant.com).

Figure 5:
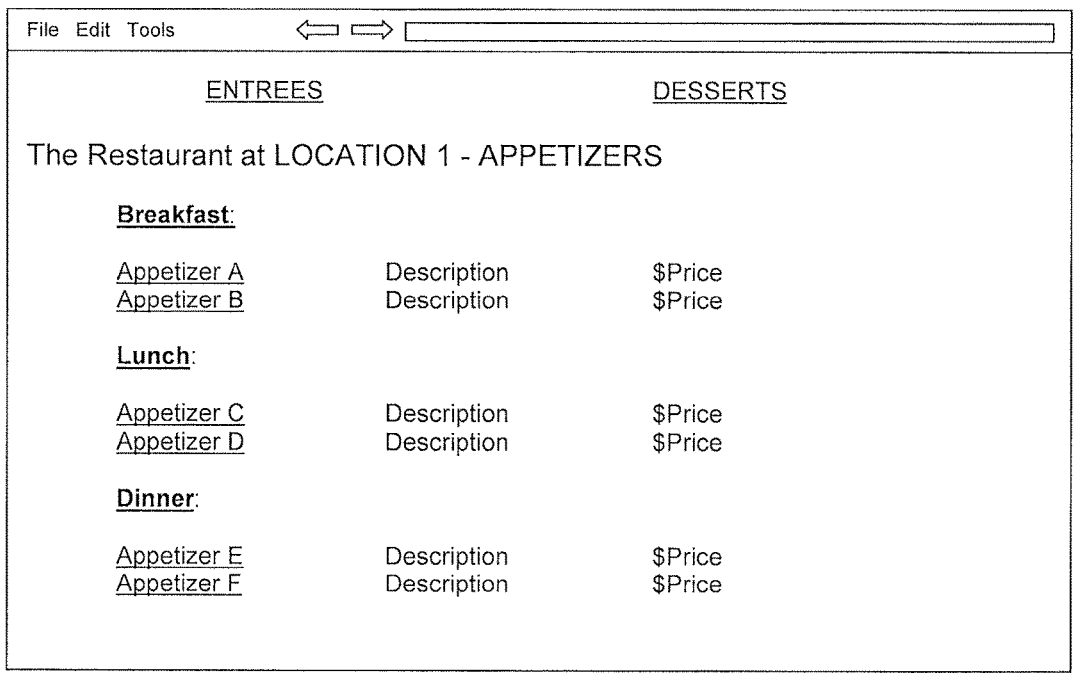
FIG. 5 is a user interface within an example embodiment generating an ordered content list from an Internet crawl.

As seen in FIGS. 5-7, each of the four locations may maintain its own website content, providing access to online content for various menus offered by each location. This content may be spread across multiple web pages for each of the locations. For example, as seen in FIGS. 5-7, Location 1 of the restaurant may include web pages for appetizers, entrees and desserts menus with links to each of the items for breakfast, lunch and dinner menu web pages. In other words, the breakfast, lunch and dinner menus may be spread across the appetizers, entrees and deserts pages and vice versa, as seen in FIGS. 5-7.

As seen in FIG. 3, the website crawling software may be configured to crawl the restaurant website and analyze the structure and content of the restaurant website's web pages (Step 301). The web crawling software 200 may, during the Internet crawl, scan the online documents and logically group each document into a unit. In the context of the restaurant example, the crawl may identify a list of hypertext or other online documents, such as the landing page for the restaurant website. The website crawling software modules 200 may then be configured to systematically crawl and analyze the content of the pages for each individual restaurant location.

This website crawl may identify different tiers or levels of HTML within the website. As a non-limiting example, the content of the landing page may comprise a first level, identifying each of the location links as a link to each location's website. Each location's website may comprise another level of HTML, and various levels of HTML may be identified within the content of each location's website. For example, each menu web page may comprise a level of HTML separate from the landing page HTML. The content within each of these web pages may comprise another level of HTML. For example, different levels of HTML within the website content may include: the navigation for appetizers, entrees and desserts pages, the groupings of breakfast, lunch and dinner menus within these pages, and the groupings of specific appetizers entrees and/or desserts within the menus.

In the context of the restaurant website landing page example, the final result generated (and therefore the ultimate goal of the invention) may be to crawl the content of the restaurant website, identify the menu pages and items that are common between the 4 locations, and post the common menus to each of the 4 locations. Each location may then determine which of the common menus to display on its individual collection of web pages.

In this example, each location may want the content for the common menus organized into breakfast, lunch and dinner menus. As noted above, the web crawling software 200 may cause the crawled and extracted content to become randomized, without a discernible order, thereby losing valuable information. For example, a web crawl may mix together the specific appetizers, entrees and desserts from their respective pages, losing the logical groupings of the menu items into specific breakfast, lunch and dinner menus. Another goal of the disclosed invention, therefore, may include grouping these logical groupings together in the final result, and group them in the right order. In this example, the breakfast, lunch and dinner menus would be grouped in a logical order of appetizers, entrees and desserts in the final result.

As the web crawling software 200 traverses each page within the website, it may identify link clusters according to connections between identified links configured to navigate to additional web pages. The pages may be logically grouped into a unit, with an understanding that there's some sort of connection between them. Thus, using the restaurant website example, the appetizers, entrees and desserts web pages may comprise link clusters for appetizers, entrees and desserts, respectively, logically grouped into breakfast lunch and dinner menus. Each page may also include a link cluster from the top navigation bar consisting of links to the other two pages.

During or subsequent to the website crawl, one or more TOC software modules 210 may be configured to detect, extract, collect and/or temporarily store (for comparison and voting purposes described below) all TOCs identified within the crawled website (Step 302). Each TOC may comprise a list of internal hyperlinks configured within the website content for a user to navigate to additional pages within the website. Each list may comprise a consecutive cluster of three or more links in a serialized web page grouped together into a single unit.

Each of the TOCs may be temporarily stored for comparison and/or voting purposes in order to recover and/or synthesize the original order of the website, described in detail below. The intuition is that a cluster of links in a page give a strong hint the links are related and maybe belong in a specific order.

Figure 4:
FIG. 4 is a user interface within an example embodiment generating an ordered content list from an Internet crawl.

For example, a TOC may comprise a cluster of hyperlinks on a web page for navigating to additional web pages within the website, such as a top or side navigation bar for a web page or a collection of links within the web page content. In the context of FIG. 4, as the landing page for the restaurant website is crawled, the TOC software 210 may identify the side bar navigation with links to the four locations as a TOC. Likewise, as the web pages for Location 1 (shown in FIGS. 5-7) are crawled, the TOC software 210 may identify the top navigation for Appetizers, Entrees and Desserts as a TOC and the links for Breakfast, Lunch and Dinner as another TOC. To determine the cluster of links that makes up the TOC, the TOC software may execute an algorithm that groups of links into a TOC by identifying the groups of links that appear one after another in the document's Document Object Model, but which have no interleaving rendered HTML.

As the TOC software 210 iterates through each web page crawled within the website, it may aggregate a collection or set of TOCs, effectively creating a group of grouped units or a list of lists of all TOCs and TOC contents for the website (Step 303). In the context of FIG. 4, the TOC comprising links to the four restaurant locations may be a TOC unit comprising the first list or group item in the set. The top navigation for entrees and desserts on the appetizers page in FIG. 5 may be a unit comprising a second list or group item in the set and the breakfast, lunch and dinner links may comprise a third list or group item in the set. The top navigation for appetizers and desserts on the entrees page in FIG. 6 may be a unit comprising a fourth list or group item in the set, and the breakfast, lunch and dinner links may comprise a fifth list or group item in the set. The top navigation for appetizers and entrees on the desserts page in FIG. 7 may be a unit comprising a sixth list or group item in the set, and the breakfast, lunch and dinner links may comprise a seventh list or group item in the set.

The TOC software 210, and/or the link group software 220 described below, may be configured to handle TOCs (or link groups) that differ, are missing links to the current page, and are hierarchical. In other words, this software 210, 220 may analyze the structure of the website, the set of TOCs and/or link groups, and each individual TOC or link group unit, and may eliminate anomalies or noise within each.

The TOC software 210 may run one or more algorithms to detect TOCs at multiple granularities in the documents. In the restaurant example, these algorithms may run at the level of restaurant landing page, identifying the TOC for the restaurant locations at this level, then may run the algorithms at the level of each location, identifying pages for appetizers, entrees and desserts menus at this level, then identifying TOCs for the top navigation and the breakfast, lunch and dinner menus as TOCs at the level of each page for each location, etc.

The TOC software 210 and/or link group software 220 may also handle anomalies in TOC/link group order and/or missing links. This software 210, 220 may handle TOCs which have an alternative order. For example, if the appetizers page were to have a TOC comprising links, in order, of breakfast, lunch and dinner, but the entrees page were to have a TOC, in order, of dinner, lunch and breakfast, these would be recognized as analogous TOCs for analysis, merging and comparison purposes.

Software 210, 220 may handle TOCs which are missing links. As seen in FIGS. 5-7, a common pattern for TOCs includes a TOC with no link to the current page, resulting in an incomplete TOC. For example if the entree page in FIG. 6 is being displayed, the top navigation may include a link to the appetizers page and a link to the desserts page, but no link to the entree page. In this example, none of the TOCs for the appetizers/entrees/desserts navigation would be complete, since each would be missing a single page. Software 210, 220 may be configured to identify these missing pages, and compensate accordingly.

One or more link group software modules 220 may be configured to form or generate one or more link groups. To accomplish this, the link group software 220 may crawl or otherwise traverse each of the TOCs, within the entire stored set of collected TOCs associated with the website, comparing each TOO with each additional TOO in the set (Step 303).

The link group software 220 may identify common links, or the lack thereof, between TOCs. These common links between web pages may be used to identify a connection between the TOCs. For example, in the context of the restaurant website in FIGS. 4-7, the TOC created from the restaurant website landing page seen in FIG. 4 may be compared with each of the other TOCs in the set, such as the TOCs generated from the content of the appetizers, entrees and desserts pages in FIGS. 5-7. The link group software 220 may determine that no other TOCs in the set of TOCs contain links to web pages for Location 1, Location 2, Location 3 or Location 4. Because the TOC created from the landing page contains no common links with any other TOC generated from the website, the TOC generated from the landing page may comprise a unique link group and the link group software may identify, form or generate a first unique link group accordingly (Step 304).

One goal of the link group software 220 is to generate a set of unique link groups from the entire set of TOCs, where each link to a page appears in exactly one link group. To generate this set of unique link groups, link group software 220 may merge TOCs containing common links into link groups (Step 304).

As a non-limiting example, after traversing the set of all TOCs generated from the restaurant website, link group software 220 may determine that the TOCs for the appetizers page, the entrees page and the desserts page all share common links to breakfast, lunch and dinner menu pages. Link group software 220 may use this determination to merge the TOCs from the appetizers, entrees and desserts pages respectively, into a unique link group comprising the links to breakfast, lunch and dinner menu pages, which are common to all three TOCs.

In the example above, the links in each TOC from the appetizers, entrees and desserts pages includes a link overlap of 100%, since the TOC for each page includes links to a breakfast, lunch and dinner menu web page, with no additional links. Link group software 220 could therefore easily merge these TOCs into a unique link group. However, to accomplish the goal of generate a set of unique link groups from the entire set of TOCs where each link to a page appears in exactly one link group, the link group software 220 may also be configured to merge TOCs that overlap by less than 100% into a unique link group. Link groups need not be identical for the software to merge them, but they do need to be sufficiently similar.

To accomplish this, the link group software 220 may identify TOCs, in the set of TOCs generated for the website, that overlap by at least one common link to a web page. For example, the TOC generated from the top navigation on each of the appetizers, entrees and desserts pages seen, in FIGS. 5-7, include overlap between the appetizers, entrees and desserts links. The TOC for the top navigation for each page includes links to the other two pages, so the TOC for the appetizers page overlaps with the TOC for the entrees page since both TOCs include a link to the desserts page, the TOC for the entrees page overlaps with the TOC for the desserts page since both TOCs include a link to the appetizers page and the TOC for the desserts page overlaps with the TOC for the appetizers page since both TOCs include a link to the entrees page.

Having identified the potential TOCs to be merged, link group software 220 may be configured to generate a merged link group comprising one instance of each of the links found in each of the TOCs sharing at least one common link, and may determine the number of links included in the group. Using the example from the TOCs for the top navigation on each of the appetizers, entrees and desserts pages above, this merged link group would include a total of three links: a single instance of the appetizers link, a single instance of the entrees link and a single instance of the desserts link.

Having generated the merged link group, link group software 220 may calculate whether each of the TOCs, which overlap by at least one common link, also overlap with the generated merged link group by an amount of common links greater than a pre-determined threshold value. The threshold value may justify merging the TOCs based on a significant overlap of common links, or a substantial similarity between each of the TOCs and the merged link group.

This threshold value may comprise a numeric value or a percentage value based on the number of links in each of the TOCs as compared with the total number of common links in the merged link group. This threshold value may be set by any administrator of the disclosed software 200, 210, 220, 230, such as a web host, a software developer, a user with access to a control panel for the software, etc., or may be learned based on the experience of the system.

Link group software 220 may identify and compare the overlap between each of the TOCs sharing at least one common link and the merged link group comprising an aggregation of the total merged links. If the overlap between each original TOC and the merged total link group is greater than the predetermined threshold value, the link group software 220 may determine that the TOCs identified as overlapping should be merged into a single unique merged link group.

For example, the threshold value may require at least a 60% overlap between each of the TOCs sharing at least one common link and the merged link group in order for the TOCs to be merged into a single unique merged link group. Using the example from the TOCs for the top navigation on each of the appetizers, entrees and desserts pages above, link group software 220 may compare the overlap of common links with each of these TOCs against the merged link group. Each of these TOCs overlap with the merged link group by two links, since the merged link group includes links to appetizers, entrees and desserts, the TOC from the appetizers page includes links to entrees and desserts, the TOC from the entrees page includes links to appetizers and desserts, and the TOC from the desserts page includes links to appetizers and entrees.

The overlap for each of these TOCs is therefore 2/3 or 66%. Each of the TOCs therefore overlap with the merged link group by more than the 60% threshold value. Link group software 220 may therefore determine that the TOCs should be merged, and may merge the TOCs into a generated unique merged link group, comprising the links in the original link group, accordingly.

During generation of the merged link group and/or the unique merged link group, the TOCs may be considered sufficiently similar to the merged link group if the overlap between the link groups contain the same links in a different order, or contain a common pattern where there is no link for a page that contains the link group causing an incomplete TOC, according to the methods for handling anomalies disclosed above. For example, the original order of the TOCs may be temporarily dropped, then later handled according to the voting algorithms within the content ordering software module(s) 220 disclosed below.

Link group software 220 may repeat the merging process, iteratively merging TOCs that have common links greater than the threshold value, until one or more link groups are identified where the amount of common links are dissimilar enough to be below the threshold value. As each set of TOCs fall below the threshold value, link group software 220 may identify and add an extra link group containing all pages not in any group. In some embodiments, link group software 200 may then remove links belonging to multiple link groups from the smallest and last crawled link groups such that each page appears in exactly one link group.

Using the examples above, the TOC from the restaurant website landing page may comprise a unique link group, the TOCs from the breakfast, lunch and dinner menus may be merged into a unique merged link group and the TOCs for the top navigation on each of the appetizers, entrees and desserts pages may be merged into a unique merged link group.

Having completed the first general step of crawling web pages to generate and analyze TOCs and link groups (Step 300), content ordering software module(s) 220 may then be configured to complete the second general step: 2) identify a correct website structure and/or content order by comparing link groups with the original TOCs. (Step 310).

As noted above, the web crawling software 200 may cause the crawled and extracted content, such as the crawled website pages, the website link clusters and the navigation to the pages they represent, to become randomized, without a discernible order.

One or more content ordering software modules 220, comprising the link and/or page ordering algorithms disclosed herein, may be configured to compare the generated and merged link groups with the original TOCs in order identify or determine a correct structure, order and/or semantics for the website or the website content. Therefore, the generation and analysis of TOCs and link groups (Step 300) may initialize the steps for identifying a correct website structure and/or content order by comparing link groups with the original TOCs (Step 310).

The content ordering software 230 may order the links in each link group by the ordering algorithm disclosed herein, then may order the link groups themselves using the same algorithm run on the first link of each group. The concatenation of all these link groups is the order used in the final result.

In the context of the restaurant website example used herein, if the restaurant were to have separate pages for appetizers, entrees, desserts and beverages, the restaurant manager may want to also have physical printouts of the menus within their physical restaurants. The disclosed software may include a feature allowing the manager of the restaurant to convert the menu from the website into a print menu, or a menu that would be available from a single page. In order to create either of these menus, the restaurant manager would need the ability, provided through the disclosed software, to print the menu items in the correct order, as preserved from the order (and nested order) of the original multi-page menu.

To accomplish this, the content ordering software 230 may employ three heuristics to determine the order of links within and among TOCs and link groups. First, the content ordering software 230 may use a vote-based ordering between all link orders in TOCs, in which the most popular order wins. If this results in a tie, content ordering software 230 may be configured to fall back to a vote-based ordering of links on each page. If this fails, content ordering software 230 may be configured to fall back to crawl order.

The content ordering software 230 may comprise the one or more link or page ordering algorithms based on weighted voting in order to discover or provide a consensus ordering for each of the pages represented by the links in each link group (Step 311). The link ordering algorithms may include voting algorithms providing a consensus ordering based on weighted voting. The links may then be ordered in each link group and/or ordered as a final TOC according to the disclosed ordering algorithms.

The content ordering software 230 may be configured to systematically crawl or otherwise traverse the link groups generated and merged from the TOCs. Using the examples above, three unique link groups may have been generated and merged from their respective TOCs: one generated from the restaurant website landing page, one generated from the breakfast, lunch and dinner menus and one generated from the top navigation on each of the appetizers, entrees and desserts pages.

Each of these unique generated and merged link groups may be compared with the identified original TOCs, that the link group was generated and merged from, in order to determine the correct link order. Each of the identified TOCs may likewise be crawled or otherwise traversed to determine that the original TOC comprises at least two links in common with the link group being compared.

As a non-limiting example, the unique link group generated and merged from the top navigation on each of the appetizers, entrees and desserts pages may be compared with the TOCs from each page respectively. The link group may comprise three links including links to the appetizers, entrees and desserts pages. Each of the TOCs for these respective pages may include two common links with the three in the link group.

The voting algorithms may systematically determine order based on discrete pairs of links common between the link group and the TOCs (Step 312). For each discrete pair of links (e.g., link A and link B in the TOC common to the link group), the content ordering software 230 may generate a vote calculating the order of the links (e.g., whether A goes before B or B goes before A in the original TOC). Content ordering software 230 may then log a tally or vote for this order. This process may be repeated for each of the discrete pairs and for each of the TOCs sharing at least two common links with the link group.

Content ordering software 230 may be configured to generate a matrix or other data table. This data table may organize the logged tallies or votes generated as it compares the link order of each discrete pair within each of the TOCs sharing two or more links with the link group (Step 313). The matrix may be comprised of columns and/or rows, with each column or row representing the logged order of the two or more links common to the TOCs being compared with the link group.

The content ordering software 230 may populate each cell with a tally or vote of links identified, each tally being added to a cell representing an order for the two discrete links. Each column or row may be summed to determine the final order of the links within each link group (Step 314).

The table below represents an example of the type of matrix generated and populated by the content ordering software 230. Using the examples above wherein the unique link group is generated and merged from the top navigation on each of the appetizers, entrees and desserts pages, each of the original TOCs from the top navigation of the appetizers, entrees and desserts pages respectively may be systematically traversed to populate the table.

In this example, the TOC from the top navigation of the appetizers page is ordered entrees, then desserts. A tally or vote of 1 is therefore added to the column for Entrees, Desserts; and −1 is added to Desserts, Appetizers. The TOC from the top navigation of the entrees page is ordered appetizers, then desserts. A tally or vote is therefore added to the column for Appetizers, then Desserts. The TOC from the top navigation of the desserts page is ordered appetizers, then entrees. A tally or vote of 1 is therefore added to the column for Appetizers, Entrees; and −1 is then added to Entrees, Appetizers.

|  | Appetizers | Entrees | Desserts |
|---|---|---|---|
| Appetizers |  | +1 | +1 |
| Entrees | −1 |  | +1 |
| Desserts | −1 | −1 |  |

In light of the link or page ordering algorithms based on weighted voting disclosed above, the final order of the link group would be Appetizers, then Entrees, then Desserts. Using the new matrix, the question "Do appetizers come before entrees?" can be answered as follows: Appetizers, Entrees>Entrees, Appetizers or +1>−1.

Additional embodiments could be imagined, wherein the matrix comprises the links to be compared on a horizontal matrix representing links coming before and a vertical matrix represents links coming after. The tally/vote could be logged at the junction of the two matrices.

The final result may comprise synthesis of the crawled content via the disclosed algorithms. In the context of the restaurant menu examples disclosed herein, the final result may be used for any crawled content methods, such as pushing out the data as menu items, processing pages for printing menus, etc. Other applications may include data used in robots.txt, to notify other web crawlers of the appropriate order in which to crawl the site.

The steps included in the embodiments illustrated and described in relation to FIGS. 1-7 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a first hardware server computer communicatively coupled to a network and configured to:
   access a source code for each of a plurality of web pages within a website hosted on a second hardware server computer;
   identify, within the source code of each of the plurality of web pages, a plurality of hyperlinks for navigating to at least one of the plurality of web pages, wherein each table of contents in a plurality of tables of contents comprises the plurality of hyperlinks from a corresponding web page in the plurality of web pages within the website;
   generate a plurality of hyperlink groups, wherein each hyperlink group comprises at least one common hyperlink and the one common hyperlink is common to each of the plurality of hyperlinks, wherein the at least one common hyperlink between webpages is used to identify a connection between the plurality of tables of contents;
   aggregate the plurality of hyperlink groups into a unique hyperlink group wherein each of a plurality of hyperlinks within the unique hyperlink group appears in only one hyperlink group;
   determine an order for the plurality of hyperlinks within the unique hyperlink group based on an original order of occurrence of the plurality of hyperlinks originally occurring within each table of contents in the plurality of tables of contents, wherein the unique hyperlink group is aggregated and merged from the plurality of tables of contents comprising the at least one common hyperlink; and
   apply the determined order to the plurality of hyperlinks in the unique hyperlink group.

2. The system of claim 1, wherein accessing the source code comprises a web crawl of the plurality of web pages to determine a structure or content of the website.

3. The system of claim 1, wherein the plurality of tables of contents comprise a total overlap of common hyperlinks between each of the plurality of tables of contents.

4. The system of claim 1, wherein the plurality of tables of contents comprise an overlap of common hyperlinks between each of the plurality of tables of contents greater than a threshold value.

5. The system of claim 4, wherein an additional unique hyperlink group is identified from an overlap of common hyperlinks between each of the plurality of tables of contents less than a threshold value.

6. The system of claim 1, wherein determining an order of hyperlinks within the unique hyperlink group comprises comparing the order of at least one discrete pair of hyperlinks in the unique hyperlink group with each of the plurality of hyperlinks.

7. The system of claim 1, wherein determining an order of hyperlinks within the unique hyperlink group comprises generating a matrix tallying the comparison of the order of hyperlinks in the original plurality of hyperlinks.

8. A method, comprising the steps of:
   accessing, by a first hardware server computer communicatively coupled to a network, a source code for each of a plurality of web pages within a website hosted on a second hardware server computer;
   identifying, by the hardware server computer, within the source code a plurality of hyperlinks for navigating to at least one of the plurality of web pages, wherein each table of contents in a plurality of tables of contents comprises the plurality of hyperlinks from a corresponding web page in the plurality of web pages within the website;
   generating, by the hardware server computer, a plurality of hyperlink groups, wherein each hyperlink group comprises at least one common hyperlink and the one common hyperlink is common to each of the plurality of hyperlinks, wherein the at least one common hyperlink between webpages is used to identify a connection between the plurality of tables of contents;
   aggregating, by the hardware server computer, the plurality of hyperlink groups into a unique hyperlink group wherein each of a plurality of hyperlinks within the unique hyperlink group appears in only one hyperlink group;

determining, by the hardware server computer, an order for the plurality of hyperlinks within the unique hyperlink group based on an original order of occurrence of the plurality of hyperlinks originally occurring within each table of contents in the plurality of tables of contents, wherein the unique hyperlink group is aggregated and merged from the plurality of table of contents comprising the at least one common hyperlink; and applying the determined order to the plurality of hyperlinks in the unique hyperlink group.

9. The method of claim 8, wherein accessing the source code comprises a web crawl of the plurality of web pages to determine a structure or content of the website.

10. The method of claim 8, wherein the plurality of tables of contents comprise a total overlap of common hyperlinks between each of the plurality of tables of contents.

11. The method of claim 8, wherein the plurality of tables of contents comprise an overlap of common hyperlinks between each of the plurality of tables of contents greater than a threshold value.

12. The method of claim 11, wherein an additional unique hyperlink group is identified from an overlap of common hyperlinks between each of the plurality of tables of contents less than a threshold value.

13. The method of claim 8, wherein determining an order of hyperlinks within the unique hyperlink group comprises comparing the order of at least one discrete pair of hyperlinks in the unique hyperlink group with each of the plurality of hyperlinks.

14. The method of claim 8, wherein determining an order of hyperlinks within the unique hyperlink group comprises generating a matrix tallying the comparison of the order of hyperlinks in the original plurality of hyperlinks.

* * * * *